United States Patent [19]

Walker

[11] Patent Number: 4,739,807
[45] Date of Patent: Apr. 26, 1988

[54] APPARATUS AND METHOD FOR FORMING AND INSERTING WAVE WINDINGS INTO A DYNAMOELECTRIC MACHINE STATOR CORE

[75] Inventor: Robert G. Walker, Ossian, Ind.

[73] Assignee: Statomat-Globe, Inc., Dayton, Ohio

[21] Appl. No.: 933,769

[22] Filed: Nov. 21, 1986

[51] Int. Cl.$^4$ .............................................. B21F 3/04
[52] U.S. Cl. .................................................. 140/92.1
[58] Field of Search ................ 140/92.1, 92.2; 29/596

[56] References Cited

U.S. PATENT DOCUMENTS 3,791,419 2/1974 Arick et al.
4,357,968 11/1982 Kieffer
4,512,376 4/1985 Barrera
4,580,606 4/1986 Barrera

OTHER PUBLICATIONS

Pavesi Publication "Modular Programmable Center Mod. MCP2".

Primary Examiner—Lowell A. Larson
Attorney, Agent, or Firm—Jeffers, Hoffman & Niewyk

[57] ABSTRACT

An apparatus for wave winding, forming and transferring a coil and for inserting the coil into the slots of a stator core. The coil is first wound on a coil form. After this, a pair of forming arms having wire formers mounted thereon to form a plurality of loops in the coil. Before the coil is stripped from the coil form, coil insertion tooling is moved relative to the coil form. The forming device includes apertures into which a pair of the insertion tooling blades are inserted whereby part of the wire formers will be located inside the insertion tooling blade array and part of the wire formers will be located outside of the blade array.

17 Claims, 4 Drawing Sheets ific machine stator core. More particularly, the invention re-

APPARATUS AND METHOD FOR FORMING AND INSERTING WAVE WINDINGS INTO A DYNAMOELECTRIC MACHINE STATOR CORE

BACKGROUND OF THE INVENTION

This invention relates to a method and apparatus for winding and inserting coils into a dynamoelectric machine stator core. More particularly, the invention relates to wave winding coils and inserting the coils into the slots of a dynamoelectric machine stator core.

There has been an increased need for very small, multiphase electric motors for use in automobiles and the like to perform various functions.

However, prior art motor coil winding and insertion methods have not been adapted to small motors. One prior art method for manufacturing the stators for multiphase alternating current dynamoelectric machines has been to wind a coil for each phase and each pole and to insert the coils into the slots of the core of a dynamoelectric machine, more commonly called a stator core. Since each of the coils has two leads, one problem with this method is the difficulty of handling and connecting the many leads. Thus for a three phase, four pole motor, twenty-four leads would have to be handled and connected with this prior art method.

An improvement upon this prior art winding and inserting method is to provide consequent windings for the stator which would result in a total of six coils for a three phase, four pole motor. This method thus results in a total of twelve leads to be handled and connected.

A further improvement is to use the wave winding method for manufacturing the coils since this method results in three coils and a total of six leads. While the wave winding method has advantages, one of the problems with this method is that the prior art equipment for winding, forming and inserting such coils is relatively bulky and because of space requirements, needs to be located outside the insertion tooling blade array. When a winding has been wound on a coil form and then formed or shaped, the winding must be stripped from the coil form onto the insertion tooling. Prior art wave winding equipment and methods have been limited to manufacturing relatively large motors. This prior art equipment has not been successful in manufacturing small motors since the wave winding forming elements could not be moved inside the circular array of blades of the inserting tooling.

In one prior art wave winding and inserting machine a circular coil is first wound and a set of pulling members restrains portions of the coil from radial inward movement while a set of pushing members pushes alternating sections of the coil radially inwardly, thus forming a star shaped winding. The winding is then stripped from the winding and former tooling and placed on the insertion tooling. By necessity, due to the size of the pushing and pulling elements, these members are located outside the insertion tooling blade array. Due to the inherent resilience or springiness of the coil wire, it is difficult to reliably transfer coils so formed to the insertion tooling.

In another prior art machine, a curved set of forming members is located above the insertion tooling blade array and the forming elements have slots cut in their bottom surfaces so that the top edges of the insertion blades can be located therein during the transfer of the coils into the inserting tooling. Thus, the front surfaces of the forming member are disposed within an extension of the interior of the circular array of blades. This method only partially solves the transfer problem since the forming members are not located inside the blade array. Furthermore, since the forming members are still relatively bulky they cannot be made small enough to transfer the windings for very small motors such as, for instance, motors having a stator core bore of one inch or less.

One prior art method for manufacturing these motors has been to increase the size of the bore of the stator core and the stator core slots, thus resulting in less stator core material and poor slot fill and less efficient motors.

What is therefore desired is to provide a method and apparatus whereby wave windings may be formed and inserted in very small stator cores and wherein the forming members extend into the interior of the insertion blade array for positive transfer of the windings into the insertion tooling.

SUMMARY OF THE INVENTION

The present invention, in one form thereof, overcomes the disadvantages of the above described prior art methods and equipment for winding, forming and inserting wave wound coils into the stator cores of dynamoelectric machines.

The method comprises providing apertures in the coil forming member whereby at least one of the insertion blades may be inserted into each of the forming member apertures whereby a portion of each coil forming member is located inside the blade array and a portion of each coil forming member is located outside the blade array during the transfer of a coil from the coil form onto the insertion tooling. Thus the coil forming members first form a coil and after this the coil insertion blade array is moved relative to the coil forming members and the coil form whereby at least one of the insertion blades will extend through the aperture of each forming member. Thus the coil is stripped from the coil winding form and transferred to the inserting tooling while the coil is retained in its desired shape by the forming members.

An advantage of the apparatus according to the present invention is that very small motors may be manufactured by the method and apparatus since the forming members enter the insertion tooling blade array. Furthermore the coils, as they are being transferred from the coil form onto the inserting tooling, will retain their shape.

The method and apparatus of the present invention permits the insertion of coils into the slots of a stator core with satisfactory slot fill and results in an efficient motor. Furthermore the method permits the manufacture of very small motor stators with wave windings whereby very few leads need to be handled and connected.

The present invention, in one form thereof, provides a method for winding, forming, and transferring a multipolar stator coil in an apparatus including a winding form, a wire former having an aperture therein, coil transfer tooling having a plurality of insertion blades arranged in a circumferential array and operatively associated with the winding form and wire former. The method consists of winding a coil on the coil form about a central axis and then deforming the coil by moving the wire former radially inwardly toward the central axis and a portion of the coil. Relative movement is then effected between the coil transfer tooling and the wire former whereby at least one of the insertion blades enters the aperture in the wire former so that a portion of the wire former is located within the blade array and a portion of the wire former is located outside the blade array. The coil is then stripped from the coil form onto the transfer tooling.

The present invention, in one form thereof, provides an apparatus for forming coils to be inserted into a dynamoelectric machine stator core and for transferring the coils to transfer tooling. The apparatus includes a coil form including at least two spaced apart portions symmetrically arranged about a central axis. A flyer is provided for winding a coil on the coil form. Transfer tooling is provided including a circumferential array of insertion blades. A forming device deforms at least one portion of the coil radially inwardly toward the central axis. The forming device has an aperture for receiving at least one of the blades of the transfer tooling therein. Therefore, at least a portion of the forming device is located within the space bounded by the array when the transfer tooling is disposed in coil transfer relationship with respect to the coil form and the forming means.

The present invention, in one form thereof, provides an apparatus for forming and inserting coils into the slots of a dynamoelectric machine stator core. The apparatus includes a coil winding form having at least two spaced apart portions symmetrically arranged about a central axis. A winding member is provided for winding a coil on the winding form. Transfer tooling is provided including a circular array of insertion blades. The transfer tooling is relatively movable with respect to the coil winding form. A forming member is provided for forming radially inwardly directed apexes in a wound coil, the forming member including contoured radial inner surfaces. A stripper is operatively associated with the coil form, the forming means and the transfer tooling, to strip a coil from the coil form onto the transfer tooling. The stripper is adapted to be located within the circular blade array and includes contoured surfaces adapted to cooperate with the contoured surfaces of the forming means for deforming a coil therebetween.

It is an object of the present invention to provide an apparatus and method for winding and forming wave windings and for inserting the windings into the stator core of an electric motor.

It is a further object of the present invention to provide a method and apparatus for manufacturing stators for very small motors.

Another object of the present invention is to provide a method and apparatus for winding, forming and inserting coils into the stator core of an electric motor whereby very few leads need to be handled and connected.

Yet another object of the present invention is to provide a wave winding and forming apparatus wherein the forming elements enter the area bounded by the array of insertion blades.

A still further object of the invention is to provide a wave winding apparatus with apertured forming members so that the insertion blades can be disposed in their coil transfer positions relative to the winding form while the forming members are retained in their operative forming positions.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
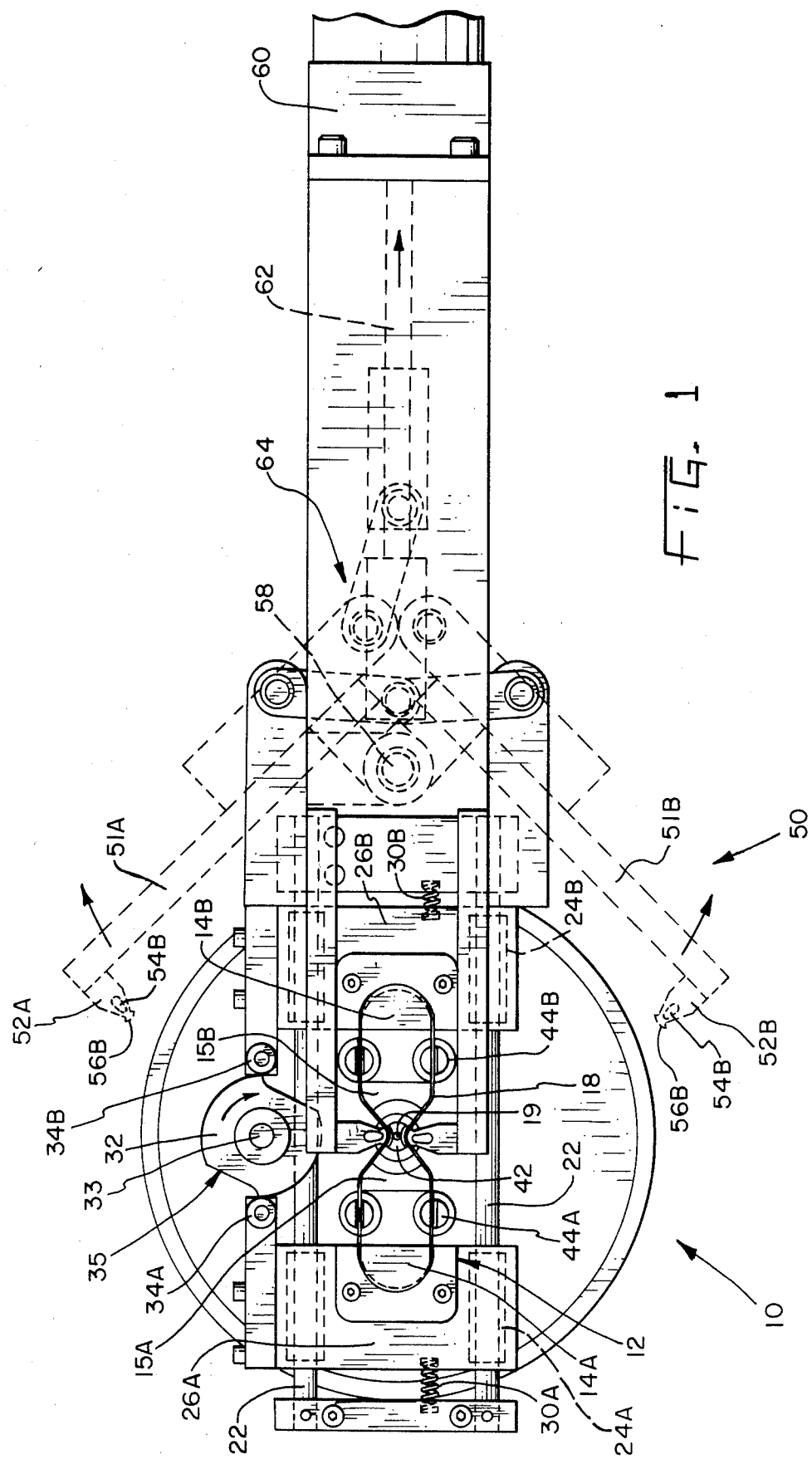
FIG. 1 is a plan view of a winding and transferring station according to the invention for a coil winding, forming and insertion apparatus.

In FIG. 1 there is shown a plan view of the winding and forming station 10. A coil form assembly 12 is shown including left hand coil form portion 14A and right hand coil form portion 14B. Furthermore, the coil form assembly 12 also includes coil form portions 15A and 15B for purposes further explained hereinafter. Coil form portions 14 and 15 are symmetrically spaced about a central axis. A coil form mounting plate 16 is shown, as best seen in FIG. 2, for securing coil form portions 14 and 15 thereto.

Coils 18 are wound on the coil form assembly 12 in a conventional manner such as, for instance, by means of a flyer whereby the elongated coil is wound about coil form halves 14A and 14B. Alternatively the coil could be wound about an arbor whereby coil form assembly 12 would rotate about the central axis. The coil 18 is wound about a section of reduced diameter of coil form halves 14A and 14B whereby shoulders 20A and 20B prevent the coil from sliding downwardly. Coil form halves 14A and 14B are inwardly collapsible and are mounted upon guide shafts 22 whereby coil 18 may be released. The coil form halves 14A and 14B are secured to bearing blocks 26A and 26B which have bearings 24A and 24B disposed therein. Coil form halves 14A and 14B are urged inwardly by means of springs 30A and 30B. Coil form half 14B is further adjustable relative to coil form half 14A by means of slot 27 and threaded fasteners 28. Thus by moving coil form half 14B relative to coil form half 14A, larger or smaller coils may be wound on coil form assembly 12. Element 31 is gear shaft support for a gear 36. A cam 32, best shown in FIG. 1, cooperates with cam followers 34A and 34B for maintaining the relative spacing of coil form halves 14A and 14B. Cam 32 has a contoured surface 35 so that, as the cam is rotated by means of cam gear 36 and a rack (not shown), the coil form halves 14A and 14B can be made to collapse under the inward urging force of springs 30A and 30B. Cam 32 and gear 36 are secured to shaft 33 with pins 37 and 38 and a retaining assembly 39.

Figure 2:
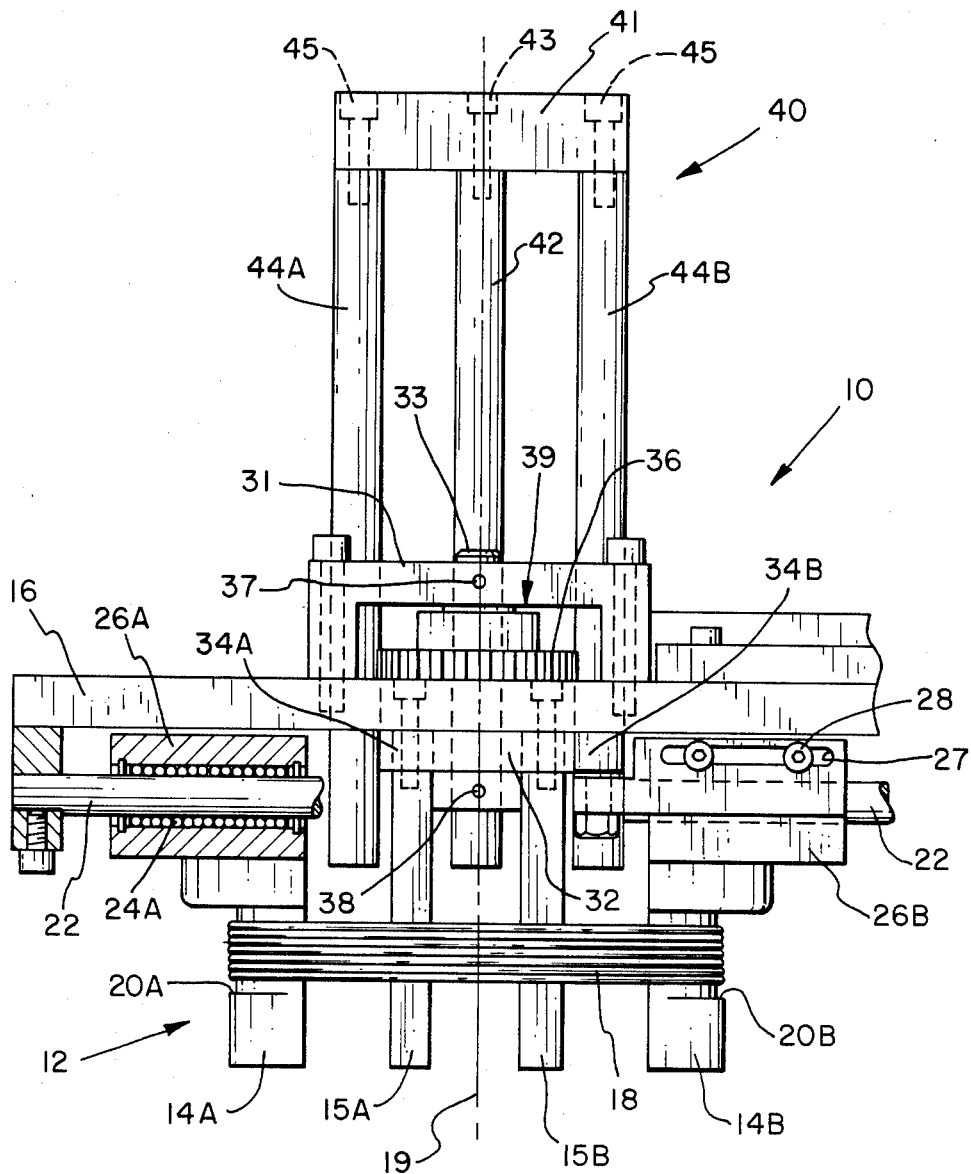
FIG. 2 is a partial elevational view of a portion of the winding and transferring station of FIG. 1.

As best shown in FIG. 2, a stripper assembly 40 includes a stripper mounting block 41 to which a center stripper rod 42 is secured by means of a threaded fastener 43. Four side stripper rods 44A and 44B are also secured to block 41 by threaded fasteners 45. Stripper block 41 and rods 43 and 44 are vertically movable by conventional means (not shown).

Figure 3:
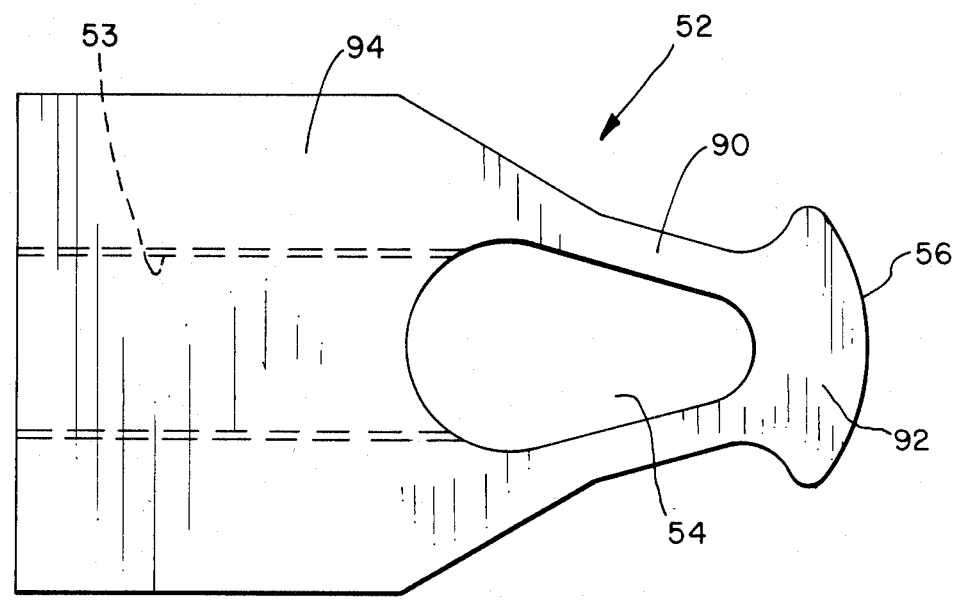
FIG. 3 is a plan view of a wire forming member for the station of FIG. 1.
Figure 4:
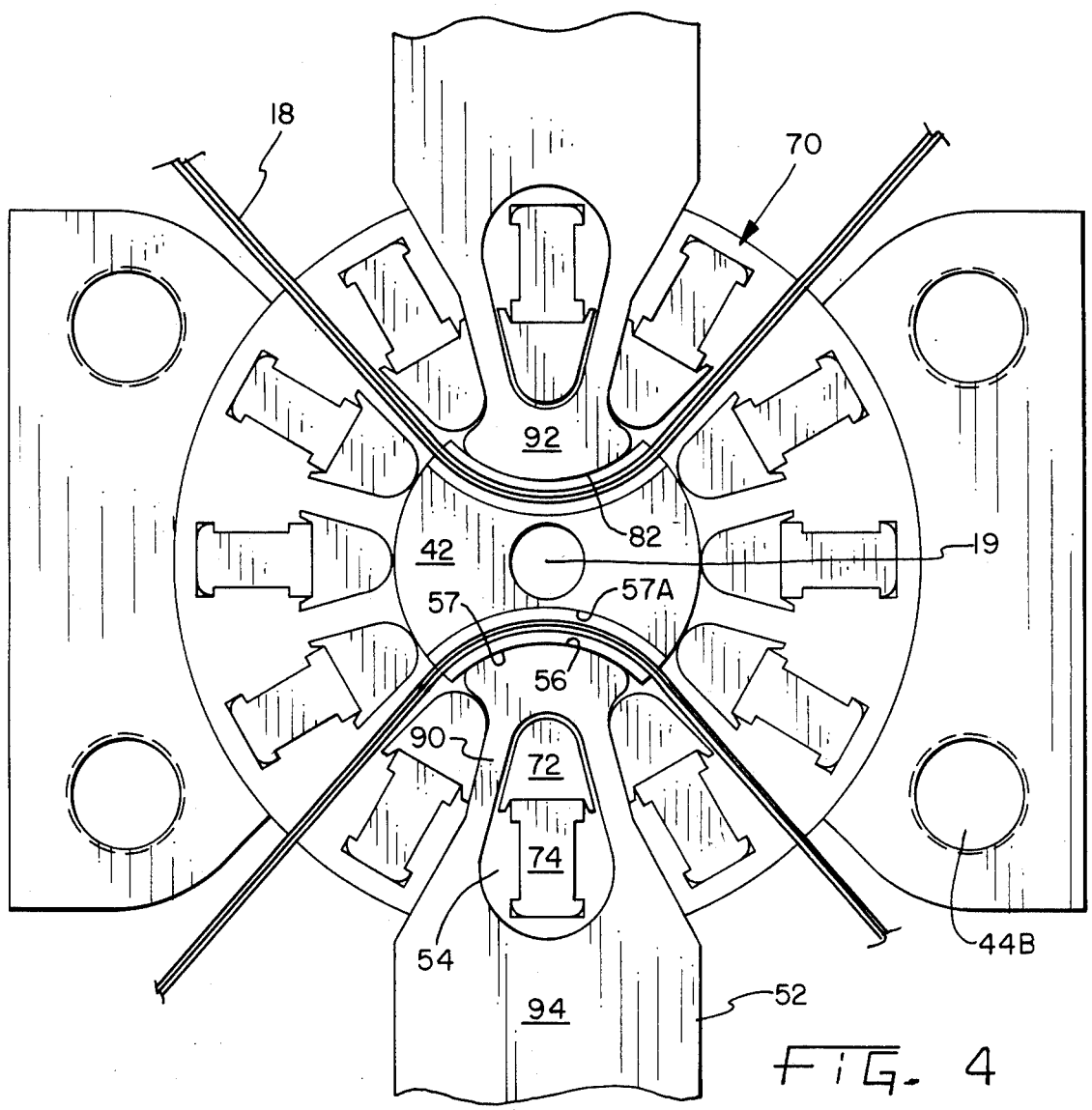
FIG. 4 is a partial cross-sectional plan view of the insertion tooling, wire stripping and wire forming assembly for the station of FIG. 1.

As shown in FIGS. 1, 3 and 4, a wire former assembly 50 is shown including two former arms 51A and 51B on the respective ends of which wire formers 52A and 52B are mounted. The end portion of each wire former 52 includes an aperture 54 as best shown in FIG. 3 for purposes explained hereinafter. Each wire former 52 also includes a threaded aperture 53 into which a threaded fastener is disposed for securing wire formers 52 to arms 51. Each wire former 52 further includes a contoured surface 56 for purposes explained hereinafter.

Former assembly 50 is operated by means of an air driven cylinder 60 having a cylinder rod 62 for operating a linkage 64. When rod 62 moves to the left as viewed in FIG. 1, wire formers 52 move radially inwardly toward the central axis of coil 18. While a coil 18 is being wound by the flyer (not shown) the coil formers are in the dotted line position shown in FIG. 1. As best seen in solid lines in FIG. 1, after the coil has been wound, wire formers 52 have been brought inwardly and the stripper assembly 40 has begun to move downwardly whereby the contoured surfaces 52 of formers 56 are closely spaced to matching contoured surfaces 57 of center stripper rod 42, thereby capturing and forming portions of the elongated sides of the coil between the surfaces 56 and 57A so that the coil sides take on the desired shape. Coil form sections 15A and 15B also have contoured side surfaces to aid in forming the coil into the desired shape with inwardly directed apexes as best shown in FIG. 1. It should also be noted that while the forming operation takes place, cam 32 simultaneously rotates thereby causing coil form sections 14A and 14B to move inwardly toward axis 19 and providing sufficient slack in coil 18 so that the apexes can be formed.

Figure 6:
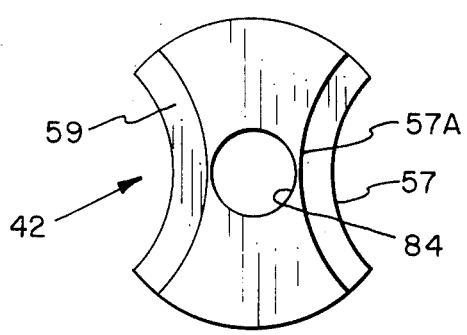
FIG. 6 is a cross-sectional view of the center stripper rod for the station of FIG. 1.
Figure 7:
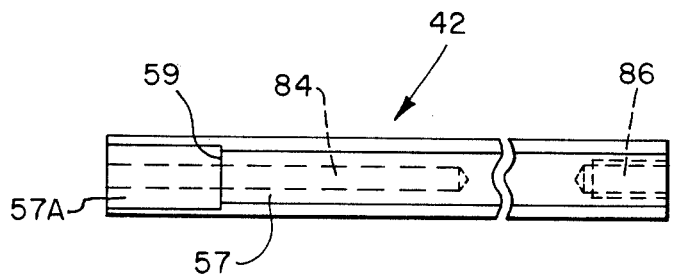
FIG. 7 is an elevational view of the center stripping rod of FIG. 6.
Figure 5:
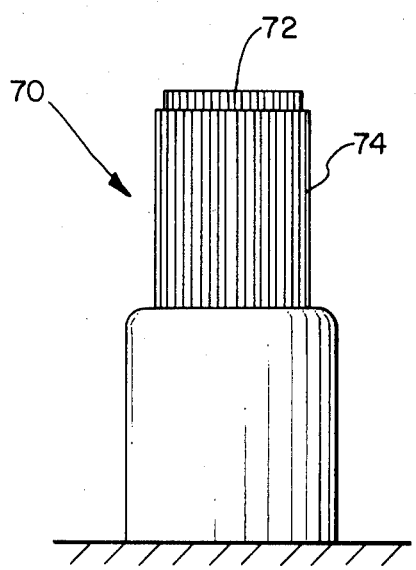
FIG. 5 is an elevational view of the insertion tooling for the station of FIG. 1.
Figure 8:
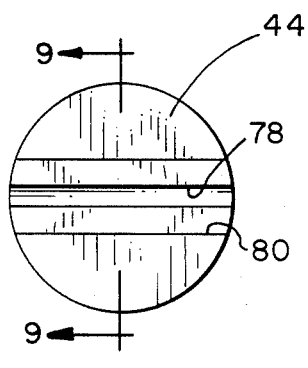
FIG. 8 is an end view of a side stripper rod for the station of FIG. 1.
Figure 9:
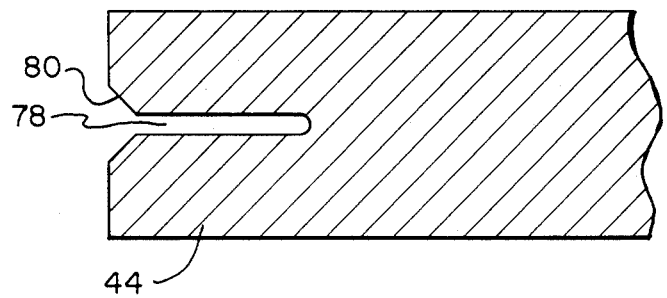
FIG. 9 is a cross-sectional view of the side stripper rod taken along lines 9—9 of FIG. 8.

The insertion tooling 70, shown in FIG. 5, comprises a conventional circular array of insertion blades 72 and wedge guides 74 disposed thereabout. FIGS. 6 and 7 show the construction of the center stripper rod of stripper assembly 40. A lower portion of the center stripper rod 42 includes contoured surfaces 57 and surfaces 57A. Surfaces 57A form shoulders 59 on the stripper rod 42 for stripping the coils onto the insertion tooling. Stripper rod 42 also includes a central bore 84 for receiving a coil separator pin located on the center of a stripper (not shown) whereby a blade alignment tool is pushed out of the blades ahead of the uppermost turns of wire on the top coil. Furthermore stripper rod 42 includes a central bore 86 for securing stripper rod 42 to stripper mounting block 41 by means of fastener 43. FIGS. 8 and 9 show the side stripper rods 44A and 44B which each include a slot 78 and tapered surfaces 80. Slots 78 capture coil 18 when it is stripped from coil form 12 and transferred onto insertion tooling 72.

Referring to FIG. 4, it can be seen that each aperture 54 in wire formers 52 is shaped to accommodate a blade 72 and a wedge guide 74. Blades 72 and wedge guides 74 are arranged in a circular array, as is conventional. The side portions 90 of wire former 52 are dimensioned to fit in the space which separates adjacent insertion blades 72. Thus, it is possible for a portion 92 of each wire former 52 to be disposed within the area inside the blade array and for the remaining portion of the wire former 52 to be disposed outside the blade array and wedge guide. As shown in FIG. 1, this arrangement is very advantageous as coil 18 may be formed, after it is wound, and the insertion tooling 70 may then be moved relative to the coil form assembly 12 and wire forming assembly 50 while coil 18 is maintained in its formed position. While the coil 18 is thus held and restrained, the coil is stripped from the coil form assembly 12 onto the insertion tooling 70. Thus, it is assured that the shape of coil 18 is positively maintained during transfer of coil 18 into insertion tooling 70 by the coil former assembly.

The operation of the equipment is as follows. Coil 18 is first wound about coil form 12 in a conventional manner. During this time, coil form halves 14A and 14B are spaced apart and are maintained in this position by means of cam 32. After coil 18 is wound and the coil wire is cut, linkage 64 is operated by rod 62 whereby arms 51 and wire formers 52 move radially inwardly toward the central axis 19 of coil 18. Simultaneously therewith, cam 32 rotates to permit springs 30 to move coil forms 14 inwardly thereby providing sufficient slack in the coil so that wire formers 52 can move the sides of coil 18 inwardly. Surfaces 56 of wire formers 52 then bottom out against the wire. Space for coil 18 is provided between surfaces 56 and contoured surfaces 57A. At this time, the sides of coil 18 will also be disposed against the sides of coil form portions 15 as best shown in FIG. 1. The transfer tooling 70 is now moved upwardly whereby two of the blades 72 move respectively into apertures 54 of respective wire formers 52. Stripper assembly 40 is now moved downwardly whereby side portions of coil 18 are captured in slots 78 of side stripper rods 44 and the formed portions of the wire are captured in the spaces between the contoured stripper rod surfaces 57 and surfaces 56 of wire formers 52. Coil 18 is then stripped downwardly by center rod 42 and the abutment of coil 18 against shoulder 59. As the stripper assembly moves further, coil 18 is stripped from coil form assembly 12 and is inserted between respective blades 72 of insertion tooling 70. Insertion tooling 70 together with coil 18 is now moved downwardly relative to coil former assembly 12 and former assembly 50. It should be noted that either tooling 70 can be moved or coil form assembly 12 and former assembly 50 may be moved to achieve the relative movement of tooling 70 with respect to coil form assembly 12 and former assembly 50.

To form a three phase motor, three wave windings are needed. Thus insertion tooling 70 is now rotationally indexed through 60° while a further coil is wound onto coil form assembly 12 and is then formed and transferred to insertion tooling 70. The insertion tooling 70 is now indexed through another 60° while a further coil is wound and formed. This coil is then transferred to tooling 70. The insertion tooling is now moved to an insertion station (not shown) where a stator core is disposed adjacent and above tooling 70 after which a stripper simultaneously strips the three coils from insertion tooling 70 and simultaneously places the three coils into the respective slots of a stator core in a conventional manner.

If desired, three winding stations may be provided whereby a first coil 18 is wound and transferred to the insertion tooling 70 at the first station, a second coil 18 is wound and transferred to the insertion tooling 70 at a second station, and a third coil 18 is wound and transferred to the insertion tooling 70 at a third station. Thus, the total operation may be speeded up by simultaneously winding, forming and transferring coils at three stations. Alternatively an indexed assembly could be provided with two sets of coil forms whereby, as a coil 18 is wound on one set of coil forms, another coil 18 is simultaneously formed and transferred to insertion tooling at the second station.

Figure 10A:
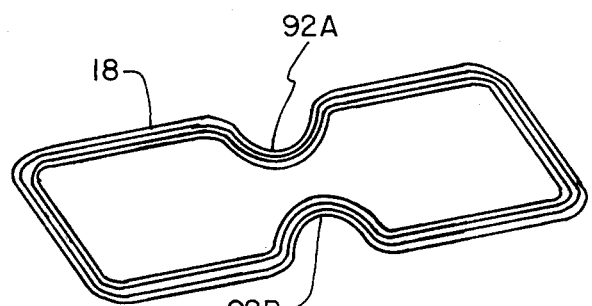
FIG. 10A, 10B, and 10C show the deformation of a coil during insertion of the coil into the slots of a stator core.
Figure 10B:
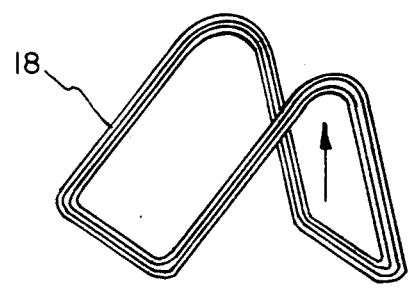
Figure 10C:
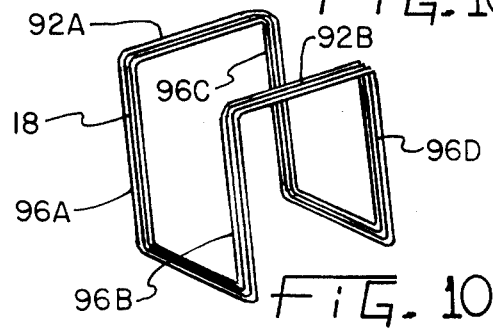

By referring to FIG. 10A, it can be seen how the formed coil 18 may be inserted into a stator core (not shown) to magnetically form four poles. Apex portions 92 are formed by wire formers 52 during the forming operations. When the coil is transferred to insertion tooling 70 it has the shape shown in FIG. 10A. After transfer of the coil to tooling 70, the coil assumes the shape shown in FIG. 10B since the coil sides will droop down. Further still, when the coil is stripped from insertion tooling 70 and is inserted into a stator core, the coil will assume the shape shown in FIG. 10C. Thus the coil sides 96 will be arranged in four respective stator core slots, thereby in effect forming two complete coils with the legs thereof being respectively 96A, 96B and 96C, 96D. Thus a single coil, as wound, formed and inserted, results in simulating two coils and forms four magnetic poles.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A method for winding, forming and transferring a multipolar stator coil in an apparatus including a winding form, a wire former having a aperture therein, coil transfer tooling having a plurality of insertion blades arranged in a circumferential array, and operatively associated with said winding form and wire former the method comprising:
   winding a coil on said coil form about a central axis;
   deforming said coil by moving said wire former against a portion of said coil radially inwardly toward said central axis;
   relatively moving said coil transfer tooling with respect to said wire former, whereby at least one of said insertion blades enters said aperture so that a portion of said wire former is located within said blade array and a portion of said forming device is located outside said blade array; and
   stripping said coil from said coil form onto said transfer tooling.

2. The method as set forth in claim 1 wherein said coil is elongated and is deformed radially inwardly toward said central axis at two points, whereby two loops are formed in said coil.

3. The method as set forth in claim 1 including the step of collapsing said coil form as said wire former deforms said coil, whereby slack is provided in said coil for accommodating the deformation of said coil by said wire former.

4. The method as set forth in claim 1 including the further steps of:
   rotationally indexing said transfer tooling;
   winding a further coil on said coil form;
   deforming said further coil; and
   stripping said further coil onto said transfer tooling.

5. An apparatus for forming coils to be inserted into a dynamoelectric machine stator core, and for transferring said coils to transfer tooling, said apparatus comprising:
   a coil form including at least two spaced apart portions symmetrically arranged about a central axis;
   means for winding a coil on said coil form;
   transfer tooling including a circumferential array of insertion blades;
   forming means for deforming at least one portion of said coil radially inwardly toward said central axis, said forming means having an aperture for receiving at least one of said blades therein, whereby at least a portion of said forming means is disposed within the space bounded by said array when said transfer tooling is disposed in coil transfer relationship with respect to said coil form and forming means.

6. The apparatus according to claim 5 wherein said forming means includes at least two wire formers and wherein said coil former is adapted to have an elongated coil wound thereon, said wire formers adapted to deform the opposed elongated sides of said coil inwardly, thereby forming two symmetrical loops in said coil.

7. The apparatus according to claim 5 wherein said forming means is moveable and said coil form portions are urged apart by urging means, said apparatus including spring biasing means for urging such coil form portions together as said forming means is moved radially inwardly whereby the slack in said coil caused by the inward movement of said coil form portions is taken up by the deformation of said coil by said forming means.

8. The apparatus according to claim 5 wherein said forming means comprises two arms having respective contoured wire formers mounted thereon, said arms being mounted for pivotal movement.

9. The apparatus according to claim 5 wherein said coil form portions are spaced apart by cam means, said cam means operatively associated with means for coordinating the movement of said coil form portions, said forming means and said transfer tooling for deforming said coil and for relatively moving said transfer tool with respect to said forming means and coil form for receiving said formed coil.

10. The apparatus according to claim 5 including stripping means for stripping a coil from said coil form and for transferring said coil to said transfer tooling.

11. The apparatus according to claim 10 wherein said stripping means includes a contoured surface and wherein said wire former each includes a contoured radial inner surfaces corresponding to said stripper contoured surface.

12. The apparatus according to claim 10 wherein said stripping means includes an inner stripping member having a contoured surface which mates with a corresponding radially inner contoured surface of said wire former, said stripping means further including at least two outer elongated stripper rods having slotted end surfaces for engaging respective portions of a coil and for stripping said coil from said coil form.

13. An apparatus for forming and inserting coils into the slots of a dynamoelectric machine stator core, said apparatus comprising:

a coil winding form including at least two spaced apart portions symmetrically arranged about a central axis;

means for winding a coil on said coil winding form;

transfer tooling including a circular array of insertion blades, said transfer tooling being relatively moveable with respect to such coil winding form;

forming means for forming radially inwardly directed apexes in a wound coil, said forming means including contoured radial inner surfaces;

stripper means operatively associated with said coil form, said forming means, and said transfer tooling for stripping said coil from said coil form and onto said transfer tooling, said stripper means including means adapted to be disposed within said circular blade array and including contoured surfaces adapted to cooperate with the forming means contoured surfaces for deforming a coil therebetween.

14. The apparatus according to claim 12 wherein said forming means include two wire formers and wherein said coil former is adapted to have an elongated coil wound thereon, said wire formers adapted to deform portions of the opposed elongated sides of said coil radially inwardly toward the axis of said coil thereby forming two symmetrical loops in said coil.

15. The apparatus according to claim 12 wherein said spaced apart coil form portions are urged together by spring biasing means, said apparatus further including means for spacing said coil form portions apart as said forming means forms apexes in said coil whereby the slack in said coil caused by said inward movement of said coil form portions is taken up by the deformation of said coil by said forming means.

16. The apparatus according to claim 12 wherein said forming means comprises two arms including contoured wire former portions mounted thereon, said arms being pivotably mounted for pivotal movement.

17. The apparatus according to claim 12 wherein the collapsed position of said coil form portions is controlled by cam means, said cam means operatively associated with means for coordinating the movement of said coil form portions, said forming means and said transfer tooling to deform said coil and relatively move said transfer tooling with respect to said forming means and coil winding form.

* * * * *